United States Patent
Qu et al.

(10) Patent No.: US 9,537,412 B2
(45) Date of Patent: Jan. 3, 2017

(54) DIRECT CURRENT VOLTAGE CONVERSION DEVICE AND CLAMPING CIRCUIT

(71) Applicants: LITE-ON ELECTRONICS (GUANGZHOU) LIMITED, Guangzhou (CN); LITE-ON TECHNOLOGY CORP., Taipei (TW)

(72) Inventors: Peng Qu, Nanjing (CN); Jianhua Zhou, Nanjing (CN); Zhihong Ye, Nanjing (CN)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 176 days.

(21) Appl. No.: 14/492,245

(22) Filed: Sep. 22, 2014

(65) Prior Publication Data

US 2015/0381075 A1    Dec. 31, 2015

(30) Foreign Application Priority Data

Jun. 25, 2014    (CN) .......................... 2014 1 0293704

(51) Int. Cl.
*H02M 7/5387*    (2007.01)
*H02M 3/335*    (2006.01)
*H02M 1/00*    (2006.01)
*H02M 1/34*    (2007.01)

(52) U.S. Cl.
CPC . *H02M 3/33576* (2013.01); *H02M 2001/0003* (2013.01); *H02M 2001/342* (2013.01); *Y02B 70/1491* (2013.01)

(58) Field of Classification Search
CPC ............... H02M 7/53871; H02M 1/00; H02M 2001/0003;H02M 2001/342; H02M 2007/4815; H02M 2007/4818; H02M 3/33538; H02M 3/33546; H02M 3/33507; H02M 3/33576; H02M 1/083; Y02B 70/1491
USPC ........................ 363/21.02, 21.03, 21.04, 132
See application file for complete search history.

(56) References Cited

U.S. PATENT DOCUMENTS

| | | | | |
|---|---|---|---|---|
| 5,559,685 | A * | 9/1996 | Lauw ................... | H02M 7/4826 323/222 |
| 6,088,247 | A * | 7/2000 | Cheng ............... | H02M 3/33569 363/16 |
| 6,191,960 | B1 * | 2/2001 | Fraidlin .............. | H02M 3/3353 363/25 |
| 6,239,989 | B1 * | 5/2001 | Ming-Ching ..... | H02M 3/33576 363/20 |
| 6,259,235 | B1 * | 7/2001 | Fraidlin ................ | H02M 3/158 323/222 |
| 6,314,002 | B1 * | 11/2001 | Qian ....................... | H02M 1/34 363/21.04 |

(Continued)

OTHER PUBLICATIONS

Search report from EIC 2800 STIC searcher Patel Samir.*

*Primary Examiner* — Timothy J Dole
*Assistant Examiner* — Htet Z Kyaw
(74) *Attorney, Agent, or Firm* — Rosenberg, Klein & Lee

(57) ABSTRACT

A direct current voltage conversion device includes a direct current to alternating current converter, a transformer, a first converter switch, a second converter switch and a clamping circuit. The clamping circuit clamps a voltage across the second converter switch to a preset value, and stores energy of a voltage peak across the second converter switch.

6 Claims, 2 Drawing Sheets

(56) References Cited

U.S. PATENT DOCUMENTS

| | | | | |
|---|---|---|---|---|
| 6,349,044 B1* | 2/2002 | Canales-Abarca | ..... | H02M 1/34 363/134 |
| 6,882,548 B1* | 4/2005 | Jacobs | ..... | H02M 1/34 363/127 |
| 8,345,450 B2* | 1/2013 | Yan | ..... | H02M 1/32 363/131 |
| 8,503,201 B2* | 8/2013 | Reilly | ..... | H02M 1/34 363/125 |
| 8,670,247 B2* | 3/2014 | Mase | ..... | H02M 1/36 363/125 |
| 8,966,294 B2* | 2/2015 | Zhan | ..... | H02M 1/34 363/17 |
| 9,112,424 B2* | 8/2015 | Kim | ..... | H02M 3/3353 |
| 2011/0133557 A1* | 6/2011 | Reilly | ..... | H02M 1/34 307/66 |
| 2011/0317452 A1* | 12/2011 | Anguelov | ..... | H02M 3/33584 363/21.02 |
| 2014/0334189 A1* | 11/2014 | Yan | ..... | H02M 3/33584 363/17 |
| 2015/0117075 A1* | 4/2015 | Matsumoto | ..... | H02M 1/126 363/126 |
| 2015/0357922 A1* | 12/2015 | Lai | ..... | H02M 3/33592 363/21.02 |

\* cited by examiner

DIRECT CURRENT VOLTAGE CONVERSION DEVICE AND CLAMPING CIRCUIT

CROSS-REFERENCE TO RELATED APPLICATION

This application claims priority of Chinese application no. 201410293704.2, filed on Jun. 25, 2014.

FIELD OF THE INVENTION

The present invention relates to a direct current voltage conversion device and a clamping circuit for use therewith.

BACKGROUND OF THE INVENTION

A voltage peak of a rectifier at a secondary-side of a direct current voltage conversion device is an important factor affecting the conversion efficiency and reliability of the direct current voltage conversion device. Energy of the voltage peak results mainly from energy of a parasitic capacitor(s) of the rectifier during charging, and a reverse recovery energy of the rectifier. Conventional clamp circuits used in a direct current voltage conversion device, such as RC damping (absorbing) circuits, and RCD damping (absorbing) circuit, are not able to clamp the voltage peak of the rectifier at a secondary-side to an ideal voltage value. Furthermore, such conventional clamp circuit is not highly reliable, resulting in the need to select a rectifier of a high voltage grade in order for the rectifier of a direct current voltage conversion device to endure voltages higher than the ideal voltage value. However, a rectifier of a high voltage grade may cost more, and may have a high turn-on resistance, which causes high power loss that decreases an overall conversion efficiency of the direct current voltage conversion device.

SUMMARY OF THE INVENTION

The object of the present invention is to provide a direct current voltage conversion device and a clamping circuit adapted for a direct current voltage conversion device that may effectively suppress voltage peaks and improve conversion efficiency.

According to one aspect of the present invention, there is provided a direct current voltage conversion device comprising:

a direct current to alternating current (DC-to-AC) converter disposed to receive a direct current input voltage, the DC-to-AC converter being operable to convert the direct current input voltage to a converted voltage that approximates an alternating current waveform;

a transformer having a first winding, a second winding and a third winding, the first winding being electrically coupled with the DC-to-AC converter for receiving the converted voltage, each of the second winding and the third winding having a first terminal and a second terminal, the second terminal of the second winding being electrically connected with the first terminal of the third winding;

a first converter switch having a first terminal electrically coupled with the second terminal of the third winding, a second terminal, and a third terminal disposed to receive a first control signal that controls the first converter switch to switch between anon state and an off state;

a second converter switch having a first terminal electrically coupled with the first terminal of the second winding, a second terminal electrically coupled with the second terminal of the first converter switch, and a third terminal disposed to receive a second control signal that controls the second converter switch to switch between an on state and an off state; and a clamping circuit electrically coupled with the first terminal and the second terminal of the second converter switch, the clamping circuit clamping a voltage across the first terminal and the second terminal of the second converter switch to a preset value, and storing energy of a voltage peak across the first terminal and the second terminal of the second converter switch.

According to another aspect of the pre sent invention, a clamping circuit is adapted for a direct current voltage conversion device. The direct current voltage conversion device is operable to convert a direct current input voltage to a direct current output voltage. The direct current voltage conversion device includes a direct current to alternating current (DC-to-AC) converter, a transformer, a first converter switch and a second converter switch. The transformer has a primary side to receive a voltage signal from the DC-to-AC converter, and a secondary side electrically connected with the first converter switch and the second converter switch. The clamping circuit comprises:

a clamp capacitor having a first terminal to be electrically coupled with a first terminal of the second converter switch, and a second terminal;

a first diode having an anode electrically coupled with the second terminal of the clamp capacitor, and a cathode to be electrically coupled with a second terminal of the second converter switch;

a clamp inductor having a first terminal, and a second terminal to be electrically coupled with the second terminal of the second converter switch;

a second diode having an anode electrically coupled with the first terminal of the clamp inductor, and a cathode; and a clamp switch having a first terminal electrically coupled with the first terminal of the clamp inductor, a second terminal electrically coupled with the second terminal of the clamp capacitor, and a third terminal disposed to receive a clamp control signal that controls the clamp switch to switch between an on state and an off state, such that energy of a voltage peak across the second converter switch of the direct current voltage conversion device is stored in the clamp capacitor before being discharged to a load.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
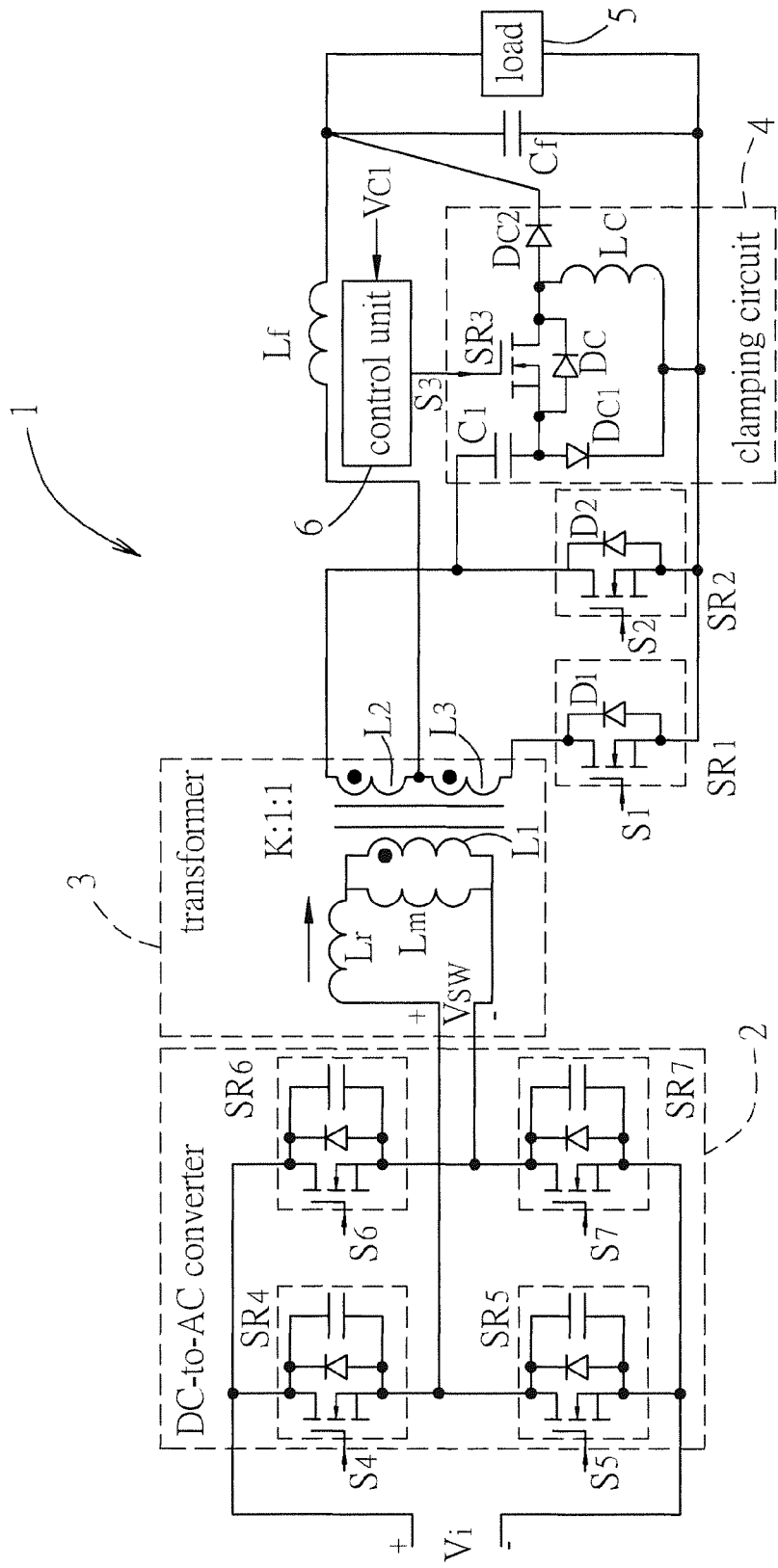
FIG. 1 is a schematic circuit diagram of a direct current voltage conversion device according to an embodiment of the present invention.

Referring to FIG. 1, a direct current voltage conversion device 1 according to the embodiment of the present invention is adapted to be electrically connected with a direct current voltage source and with a load 5 having a first terminal and a second terminal. The direct current voltage conversion device 1 includes a direct current to alternating current (DC-to-AC) converter 2, a transformer 3, a first converter switch $SR_1$, a second converter switch $SR_2$, a secondary-side inductor $L_f$, a secondary-side capacitor $C_f$, a clamping circuit 4, and a control unit 6.

Figure 2:
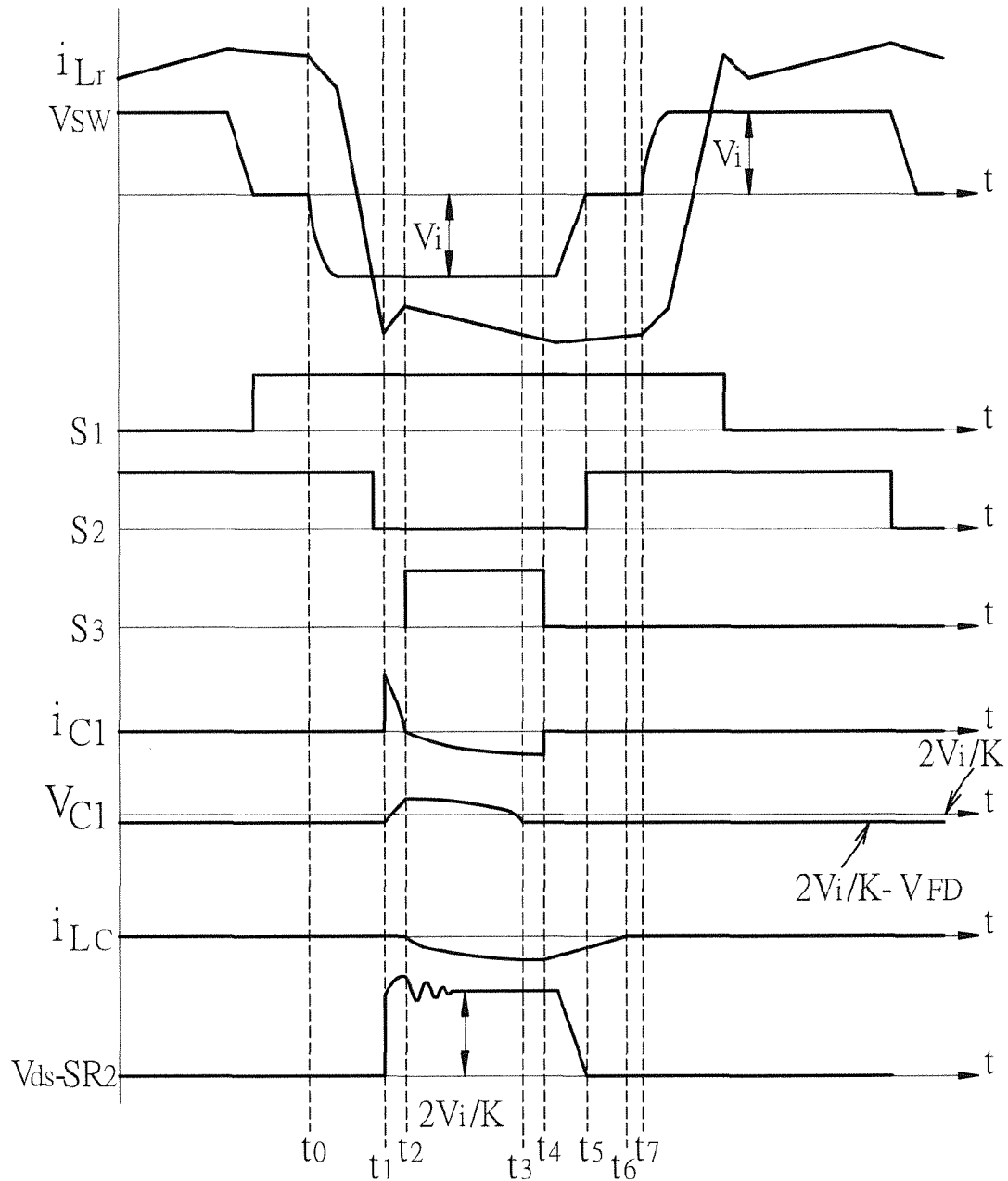
FIG. 2 is a timing diagram illustrating a plurality of signals in the direct current voltage conversion device according to the embodiment of the present invention.

The direct current to alternating current (DC-to-AC) converter 2 is disposed to receive a direct current input voltage. The DC-to-AC converter 2 is operable to convert the direct current input voltage to a converted voltage $V_{sw}$ that approximates an alternating current waveform. The direct current input voltage has a voltage value $V_i$. Referring to FIG. 2, the converted voltage $V_{sw}$ has an amplitude equal to $V_i$.

The transformer 3 has a center tap, and has a first winding $L_1$, a second winding $L_2$ and a third winding $L_3$. The turns ratio of the first winding $L_1$, the second winding $L_2$ and the third winding $L_3$ is K:1:1. The first winding $L_1$ is electrically coupled with the DC-to-AC converter 2 for receiving the converted voltage $V_{sw}$, and has a dotted terminal. Each of the second winding $L_2$ and the third winding $L_3$ has a dotted first terminal and a second terminal. The second terminal of the second winding $L_2$ is electrically connected with the first terminal of the third winding $L_3$. In FIG. 1, an equivalent circuit of the transformer 3 takes into account non-ideal factors, and thus further includes a parasitic leakage inductor $L_r$ and an excitation inductor $L_m$.

The first converter switch $SR_1$ has a first terminal electrically coupled with the second terminal of the third winding $L_3$, a second terminal electrically coupled with the second terminal of the load 5, a control terminal disposed to receive a first control signal $S_1$ that controls the first converter switch $SR_1$ to switch between an on state and an off state, and a body diode $D_1$ electrically connected in parallel with the first terminal and the second terminal of the first converter switch $SR_1$.

The second converter switch $SR_2$ has a first terminal electrically coupled with the first terminal of the second winding $L_2$, a second terminal electrically coupled with the second terminal of the first converter switch $SR_1$, a control terminal disposed to receive a second control signal $S_2$ that controls the second converter switch $SR_2$ to switch between an on state and an off state, and a body diode $D_2$ electrically connected in parallel with the first terminal and the second terminal of the second converter switch $SR_2$. The first converter switch $SR_1$ and the second converter switch $SR_2$ are commonly known as the rectifier or secondary-side rectifier.

The secondary-side inductor $L_f$ has a first terminal electrically coupled with the second terminal of the second winding $L_2$, and a second terminal electrically coupled with the first terminal of the load 5.

The secondary-side capacitor $C_f$ has a first terminal electrically coupled with the second terminal of the secondary-side inductor $L_f$, and a second terminal electrically coupled with the second terminal of the first converter switch $SR_1$.

The clamping circuit 4 includes a clamp capacitor $C_1$, a first diode $D_{c1}$, a clamp inductor $L_c$, a second diode $D_{c2}$, and a clamp switch $SR_3$.

The clamp capacitor $C_1$ has a first terminal electrically coupled with the first terminal of the second converter switch $SR_2$, and a second terminal.

The first diode $D_{c1}$ has an anode electrically coupled with the second terminal of the clamp capacitor $C_1$, and a cathode electrically coupled with the second terminal of the second converter switch $SR_2$.

The clamp inductor $L_c$ has a first terminal, and a second terminal electrically coupled with the second terminal of the second converter switch $SR_2$.

The second diode $D_{c2}$ has an anode electrically coupled with the first terminal of the clamp inductor $L_c$, and a cathode electrically coupled with the second terminal of the secondary-side inductor $L_f$.

The clamp switch $SR_3$ has a first terminal, a second terminal, a control terminal, and a body diode $D_c$ electrically connected in parallel with the first terminal and the second terminal of the clamp switch $SR_3$. The first terminal is electrically coupled with the first terminal of the clamp inductor $L_c$, the second terminal is electrically coupled with the second terminal of the clamp capacitor $C_1$, and the control terminal is disposed to receive a clamp control signal $S_3$ that controls the clamp switch $SR_3$ to switch between anon state and an off state, such that energy of a voltage peak across the first terminal and the second terminal of the second converter switch $SR_2$ is stored in the clamp capacitor $C_1$ before being discharged to the load 5. Thus, a voltage across the first terminal and the second terminal of the second converter switch $SR_2$ is clamped by the clamping circuit 4 to a preset value.

The control unit 6 generates the clamp control signal according to a voltage across the first terminal and the second terminal of the clamp capacitor $C_1$ for controlling the clamp switch $SR_3$ to switch between the on state and the off state.

In this embodiment, the DC-to-AC converter 2 is a full-wave rectifier. In other embodiments, the DC-to-AC converter 2 can be a full-bridge rectifier, a half-wave rectifier, or amultiplier rectifier. In this embodiment, the DC-to-AC converter 2 includes a fourth switch SR4, a fifth switch SR5, a sixth switch SR6, and a seventh switch SR7, each having a first terminal, a second terminal and a control terminal. The first terminal of the fifth switch SR5 is electrically connected with the second terminal of the fourth switch SR4, the first terminal of the seventh switch SR7 is electrically connected with the second terminal of the sixth switch SR6, the first terminal of the sixth switch SR6 is electrically connected with the first terminal of the fourth switch SR4, and the second terminal of the seventh switch SR7 is electrically connected with the second terminal of the fifth switch SR5.

Each of the control terminals of the fourth switch SR4, the fifth switch SR5, the sixth switch SR6, and the seventh switch SR7 receives and is controlled by a fourth control signal $S_4$, a fifth control signal $S_5$, a sixth control signal $S_6$, and a seventh control signal $S_7$, respectively. In this embodiment, each of the first converter switch $SR_1$, the second converter switch $SR_2$, the clamp switch $SR_3$, the fourth switch SR4, the fifth switch SR5, the sixth switch SR6, and the seventh switch SR7 is a power transistor. FIG. 2 is a timing diagram, illustrating how the clamp control signal $S_3$ controls the clamp switch $SR_3$ to switch between the on state and the off state. The horizontal axis represents time t, and a parasitic leak inductor current $i_{Lr}$ is the current flowing through the parasitic leakage inductor Lr on the primary side of the transformer 3, with the arrow indicating a direction of positive current flow. The clamp capacitor current $i_{c1}$ is the current flowing through the clamp capacitor $C_1$, and positive current flows from the first terminal to the second terminal of the clamp capacitor $C_1$. A clamp capacitor voltage $V_{c1}$ is the voltage across the first terminal and the second terminal of the clamp capacitor $C_1$. A clamp inductor current $i_{Lc}$ is the current flowing through the clamp inductor $L_c$, and positive current flows from the first terminal to the second terminal of the clamp inductor L. A second converter switch voltage $V_{ds\_SR_2}$ is the voltage across the first terminal and the second terminal of the second converter switch $SR_2$.

The first control signal $S_1$, the second control signal $S_2$, the fourth control signal $S_4$, the fifth control signal $S_5$, the sixth control signal $S_6$, and the seventh control signal $S_7$ are generated by a pulse width modulation (PWM) circuit (not shown) for controlling the first converter switch $SR_1$, the second converter switch $SR_2$, the fourth switch SR4, the fifth switch SR5, the sixth switch SR6, and the seventh switch SR7, respectively, to switch between the on state and the off state. By this virtue, the direct current input voltage is converted to a direct current output voltage via the DC-to-AC converter 2, the transformer 3, the first converter switch $SR_1$, the second converter switch $SR_2$, the secondary-side inductor $L_f$, and the secondary-side capacitor $C_f$, and a direct current output voltage $V_{out}$ is applied across the load 5. Since the pulse width modulation (PWM) circuit generating the first control signal $S_1$, the second control signal $S_2$, the fourth control signal $S_4$, the fifth control signal $S_5$, the sixth control signal $S_6$, and the seventh control signal $S_7$ is well known in the art, only waveforms of the first control signal $S_1$ and the second control signal $S_2$ that vary with time are shown in the FIG. 2.

During time $t_0$-$t_1$: At $t_0$, the amplitude of the converted voltage $V_{sw}$ converted by the DC-to-AC converter 2 starts to drop below zero. The transformer 3 includes the parasitic leakage inductor Lr. The first control signal $S_1$, and the second control signal $S_2$ are in a high state, and thus the first converter switch $SR_1$ and the second converter switch $SR_2$ are in the on-state. At this moment, the second winding $L_2$ and the third winding $L_3$ are shorted, and the currents flowing through the first converter switch $SR_1$ and the second converter switch $SR_2$ are in a conversion, i.e., the current flowing through the second converter switch $SR_2$ is decreasing while the current flowing through the first converter switch $SR_1$ is increasing. At time $t_1$, the conversion is completed, i.e., the current flowing through the second converter switch $SR_2$ is zero. Before the conversion is completed, the second control signal $S_2$ is switched to a low state, thus switching the second converter switch $SR_2$ to the off state. During a period that is after the second converter switch $SR_2$ is switched to the off state and before time $t_1$, the current flowing through the second converter switch $SR_2$ flows through the body diode $D_2$ of the second converter switch $SR_2$.

During time t1-t2: At time $t_1$, the second converter switch voltage $V_{ds\_SR_2}$ is equal to a voltage difference across the secondary-side of the transformer 3, i.e., the voltage difference across the first terminal of the second winding $L_2$ and the second terminal of the third winding $L_3$. At this time, the reverse recovery energy of the body diode $D_2$ and the energy of the junction capacitance (not shown) of the second converter switch $SR_2$ are stored in the parasitic leakage inductor Lr at the primary-side through coupling by the transformer 3. Since the secondary side windings of the transformer 3 treats the parasitic leakage inductor Lr as an equivalent to a secondary side leak inductor, the secondary side leak inductor and the junction capacitance of the second converter switch $SR_2$ resonates. After $T_1$, the first diode $D_{c1}$ of the clamping circuit 4 conducts current, causing the clamp capacitor $C_1$ of the clamping circuit 4 to participate in the resonance involving the secondary side leak inductor and the junction capacitance of the second converter switch $SR_2$. Furthermore, due to the capacitance of the clamp capacitor $C_1$ being much greater than the junction capacitance of the second converter switch $SR_2$, the clamp capacitor voltage $V_{c1}$ increases gradually, and the current flowing through the secondary side leak inductor decreases gradually. At time t2, the current flowing through the secondary side leak inductor decreases to zero. At the same time, the clamp capacitor current $i_{c1}$ is equal to zero and the clamp capacitor voltage $V_{c1}$ reaches a peak value, meaning that the reverse recovery energy of the body diode $D_2$ of the second converter switch $SR_2$ and the energy of the junction capacitance of the second converter switch $SR_2$ have been transferred to the clamp capacitor $C_1$.

During time $t_2$-$t_3$: At time $t_2$, the control unit 6 detects the clamp capacitor voltage $V_{c1}$ across the first and second terminals of the clamp capacitor $C_1$. When the magnitude of the clamp capacitor voltage $V_{c1}$ reaches a peak value, the clamp control signal $S_3$ is at a high state that enables the clamp switch $SR_3$ of the clamping circuit 4 to be switched to the on-state, enabling the clamp capacitor $C_1$, the clamp inductor $L_c$, and the secondary side leak inductor to resonate. At this time, the first diode $D_{c1}$ is switched from the on-state to the off-state. Furthermore, since inductance of the clamp inductor $L_c$ is much greater than that of the secondary side leak inductor, effect of the secondary side leak inductor can be neglected. The clamp capacitor voltage $V_{c1}$ gradually decreases, and the clamp inductor current $i_{Lc}$ gradually increases (absolute value of the current increases gradually). At time $t_3$, the clamp inductor current $i_{Lc}$ reaches a peak value, the clamp capacitor voltage $V_{c1}$ decreases to a value of $2V_i/K - V_{fd}$, $V_{fd}$ being a threshold voltage of the first diode $D_{c1}$.

During time $t_3$-$t_4$: At time $t_3$, the first diode $D_{c1}$ is forward-biased, causing the resonating involving the clamp capacitor $C_1$ and the clamp inductor $L_c$ to end, and the clamp inductor current $i_{Lc}$ is maintained at the peak value. At time $t_4$, when the magnitude of the clamp capacitor voltage $V_{c1}$ is reduced to a minimum value, the control unit 6 switches the clamp control signal $S_3$ to be in a low-state, causing the clamp switch $SR_3$ of the clamping circuit 4 to be switched to the off-state.

During time $t_4$-$t_5$: At time $t_4$, not taking into account the threshold voltage of the second diode $D_{c2}$, the voltage across the first terminal and the second terminal of the clamp inductor $L_c$ is equal to the voltage of the direct current output voltage, and energy is provided to the load 5 as the clamp inductor current $i_{Lc}$ flows through the second diode $D_{c2}$. Thus, the clamp inductor current $i_{Lc}$ gradually decreases (absolute value of the current decreases gradually). At time t5, the converted voltage $V_{sw}$ is zero, the first control signal $S_1$ and the second control signal $S_2$ are in a high state, and thus current flows through the first converter switch $SR_1$ and the second converter switch $SR_2$.

During time $t_5$-$t_6$: At time $t_5$, the clamp inductor current $i_{Lc}$ continues to decrease (the absolute value of the current decreases gradually). At time t6, the clamp inductor current $i_{Lc}$ becomes zero. The energy in the clamp inductor $L_c$ is provided to the load 5, i.e., the reverse recovery energy of the body diode $D_2$ and the energy of the junction capacitance of the second converter switch $SR_2$ are provided to the load 5.

During time $t_6$-$t_7$: At time $t_7$, the converted voltage $V_{sw}$ turns positive, and the next half cycle begins. The next positive half cycle of the converted voltage $V_{sw}$ is symmetrical with the negative half cycle of the converted voltage $V_{sw}$ previously described in time $t_0$-$t_7$, and thus the direct current voltage conversion device 1 operates in a similar manner and will not be further described.

In this embodiment, energy can be transferred to the load 5 by virtue of the clamping circuit 4. Referring to FIG. 2, the ripple voltage of the second converter switch voltage $V_{ds\_SR_2}$ during time $t_1$-$t_3$ is lowered from $2V_i/K*100\%$ (without the clamping circuit 4) to $2V_i/K*10\%$ i.e., the amplitude of the second converter switch voltage $V_{ds\_SR_2}$ can be smaller than $2V_i/K*110\%$. Therefore, the voltage peak of the second converter switch $SR_2$ can be effective conserved to achieve lossless transfer of energy to the load 5, without considerations for the threshold voltages of the first diode $D_{c1}$ and the second diode $D_{c2}$.

It is worth mentioning that the direct current voltage conversion device 1 can further include an additional clamping circuit 4 identical to the one described hereinabove. The additional clamping circuit 4 may be electrically connected to the first terminal of the first converter switch $SR_1$, and to the first terminal and the second terminal of the load 5. The additional clamping circuit 4 can absorb reverse recovery energy of the body diode $D_1$ and energy of the junction capacitance of the first converter switch $SR_1$, and transfer such energies to the load 5.

In summary, according to the voltage across the clamp capacitor $C_1$, the clamp switch $SR_3$ is controlled to switch between an on state and an off state, such that energy of the voltage peak of the second converter switch $SR_2$ can be transferred to the load 5 without loss. By such virtue, components that can only withstand low voltage but have low loss can be used for a first switch and a second switch of a rectifier, such that reliability, low cost and high conversion efficiency can be achieved.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A direct current voltage conversion device comprising:
    a direct current to alternating current (DC-to-AC) converter disposed to receive a direct current input voltage, the DC-to-AC converter being operable to convert the direct current input voltage to a converted voltage that approximates an alternating current waveform;
    a transformer having a first winding, a second winding and a third winding, the first winding being electrically coupled with the DC-to-AC converter for receiving the converted voltage, each of the second winding and the third winding having a first terminal and a second terminal, the second terminal of the second winding being electrically connected with the first terminal of the third winding;
    a first converter switch having a first terminal electrically coupled with the second terminal of the third winding, a second terminal, and a third terminal disposed to receive a first control signal that controls the first converter switch to switch between an on state and an off state;
    a second converter switch having a first terminal electrically coupled with the first terminal of the second winding, a second terminal electrically coupled with the second terminal of the first converter switch, and a third terminal disposed to receive a second control signal that controls the second converter switch to switch between an on state and an off state;
    a secondary-side inductor having a first terminal electrically coupled with the second terminal of the second winding, and a second terminal adapted to be electrically coupled with a load;
    a secondary-side capacitor having a first terminal electrically coupled with the second terminal of the secondary-side inductor, and a second terminal electrically coupled with the second terminal of the first converter switch; and
    a clamping circuit electrically coupled with the first terminal and the second terminal of the second converter switch, the clamping circuit clamping a voltage across the first terminal and the second terminal of the second converter switch to a preset value, and storing energy of a voltage peak across the first terminal and the second terminal of the second converter switch;
    wherein the clamping circuit includes:
    a clamp capacitor having a first terminal electrically coupled with the first terminal of the second converter switch, and a second terminal;
    a first diode having an anode electrically coupled with the second terminal of the clamp capacitor, and a cathode electrically coupled with the second terminal of the second converter switch;
    a clamp inductor having a first terminal, and a second terminal electrically coupled with the second terminal of the second converter switch;
    a second diode having an anode electrically coupled with the first terminal of the clamp inductor, and a cathode electrically coupled with the second terminal of the secondary-side inductor; and
    a clamp switch having a first terminal electrically coupled with the first terminal of the clamp inductor, a second terminal electrically coupled with the second terminal of the clamp capacitor, and a third terminal disposed to receive a clamp control signal that controls the clamp switch to switch between an on state and an off state, such that the energy of the voltage peak across the first terminal and the second terminal of the second converter switch is stored in the clamp capacitor before being discharged to the load.

2. The direct current voltage conversion device as claimed in claim 1, further comprising a control unit that generates the clamp control signal according to a voltage across the first terminal and the second terminal of the clamp capacitor.

3. The direct current voltage conversion device as claimed in claim 2, wherein:
    the direct current input voltage has a voltage value $V_i$;
    a turns ratio of the first winding, the second winding and the third winding is K:1:1; and
    the control unit controls the clamp switch such that the voltage peak across the first terminal and the second terminal of the second converter switch is clamped to be smaller than $2V_i/K*110\%$.

4. A clamping circuit adapted for a direct current voltage conversion device, the direct current voltage conversion device being operable to convert a direct current input voltage to a direct current output voltage, the direct current voltage conversion device including a direct current to alternating current (DC-to-AC) converter, a transformer, a first converter switch and a second converter switch, the transformer having a primary side to receive a voltage signal from the DC-to-AC converter, and a secondary side electrically connected with the first converter switch and the second converter switch, the clamping circuit comprising:
    a clamp capacitor having a first terminal to be electrically coupled with a first terminal of the second converter switch, and a second terminal;

a first diode having an anode electrically coupled with the second terminal of the clamp capacitor, and a cathode to be electrically coupled with a second terminal of the second converter switch;

a clamp inductor having a first terminal, and a second terminal to be electrically coupled with the second terminal of the second converter switch;

a second diode having an anode electrically coupled with the first terminal of the clamp inductor, and a cathode; and a clamp switch having a first terminal electrically coupled with the first terminal of the clamp inductor, a second terminal electrically coupled with the second terminal of the clamp capacitor, and a third terminal disposed to receive a clamp control signal that controls the clamp switch to switch between an on state and an off state, such that energy of a voltage peak across the second converter switch of the direct current voltage conversion device is stored in the clamp capacitor before being discharged to a load.

5. The clamping circuit as claimed in claim 4, further comprising a control unit that generates the clamp control signal according to a voltage across the first terminal and the second terminal of the clamp capacitor.

6. The clamping circuit as claimed in claim 5, wherein:

the direct current input voltage has a voltage value $V_i$;

a turns ratio of the first winding, the second winding and the third winding is K:1:1; and the control unit controls the clamp switch such that the voltage peak across the first terminal and the second terminal of the second converter switch is clamped to be smaller than $2V_i/K*110\%$.

* * * * *